April 8, 1947.                D. H. ANNIN                2,418,614
                           LIQUID LEVEL GAUGE
                          Filed March 6, 1944
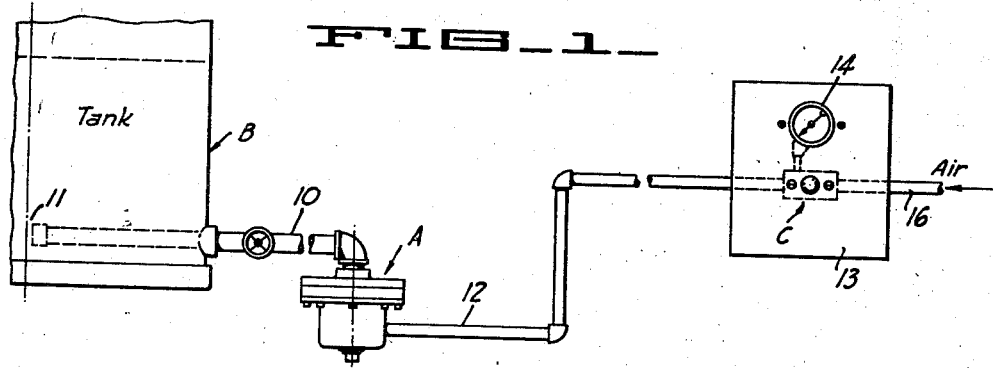
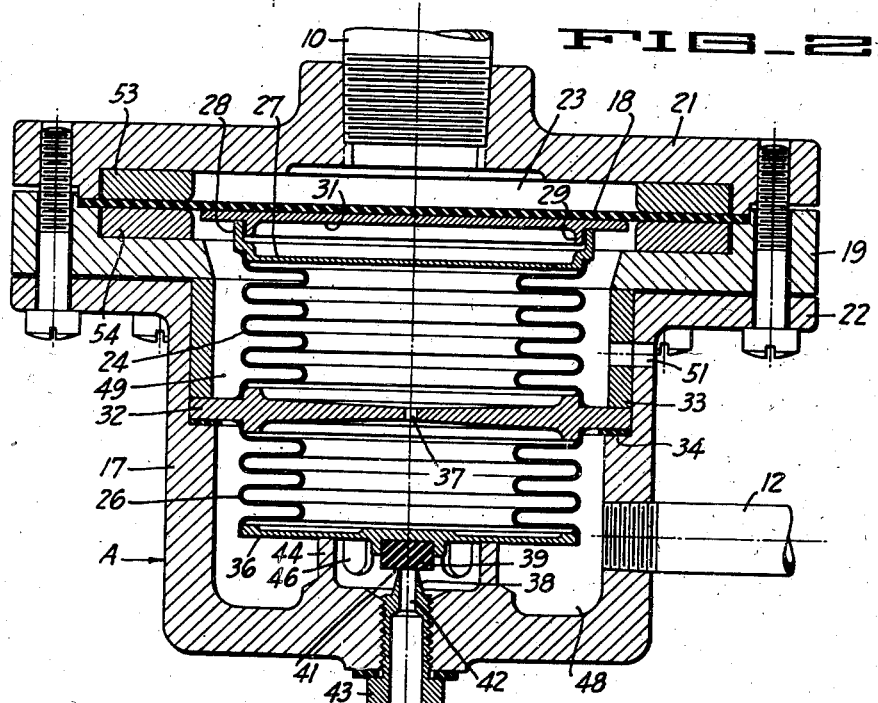
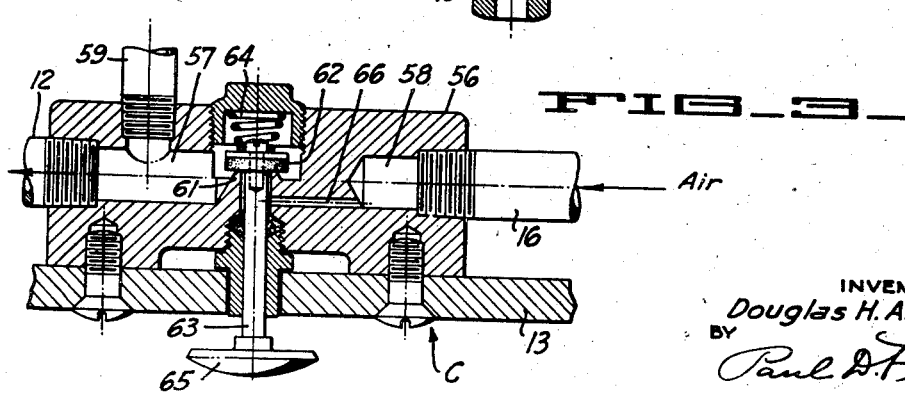
INVENTOR
Douglas H. Annin
BY
Paul D. Flehr
ATTORNEY Patented Apr. 8, 1947

2,418,614

UNITED STATES PATENT OFFICE 2,418,614

LIQUID LEVEL GAUGE

Douglas H. Annin, Oakland, Calif., assignor, by mesne assignments, to Fluid Control Engineering Co., Emeryville, Calif., a copartnership consisting of M. H. Grove and J. E. Grove, both of Piedmont, Calif.

Application March 6, 1944, Serial No. 525,169

4 Claims. (Cl. 73—302)

This invention relates generally to gauges or indicators such as are employed for indicating the depth of liquid in various tanks or storage vessels.

It is a general object of the invention to provide a liquid level gauge of the pneumatic type, which will give greater accuracy than devices of this kind which have been made in the past.

Another object of the invention is to provide a pneumatic type of liquid level gauge which can be adapted to liquids of different specific gravities or to tanks of varying heights.

A further object of the invention is to provide a liquid level gauge which is not seriously affected by surges of liquid such as tend to cause disturbing fluctuations in a conventional float indicator.

Further objects of the invention will appear from the following description in which the preferred embodiment has been set forth in detail in conjunction with the accompanying drawing.

Referring to the drawing:

Fig. 1 is a side elevational view illustrating equipment incorporating the present invention.

Fig. 2 is an enlarged side elevational view in section, showing the bleed valve and associated parts incorporated in the equipment of Fig. 1.

Fig. 3 is a cross-sectional detail, on an enlarged scale, showing the construction of the manually operated valve incorporated in the equipment of Fig. 1.

In the past liquid level gauges of the pneumatic type have been constructed with a diaphragm operated bleed or pilot valve, in conjunction with an air gauge and a source of air supply. The source of air is connected through a flow restricting orifice to piping leading to the bleed valve and to the gauge. At the bleed valve the air pressure in the piping is applied to one side of the diaphragm, while the other side of the diaphragm is directly exposed to liquid in the tank, as by mounting the diaphragm in a side wall of the tank near the bottom of the same. With such equipment the pressure in the piping connecting the gauge to the bleed valve is determined by the liquid pressure applied to the diaphragm, and therefore the indicated gauge pressure is a direct function of the liquid level. Such equipment generall lacks accuracy because the pneumatic pressure applied to the diaphragm must be comparable to the liquid pressure from the tank, and this necessitates use of a special low pressure gauge. Surges of the liquid in the tank also cause flexing of the diaphragm, with resulting undesired variations in the pressure applied to the gauge.

The present invention likewise makes use of a bleed valve operated in accordance with the level of liquid in the tank. This bleed valve is likewise connected by piping to a pressure gauge, and the piping is supplied with air from a source of supply, through an orifice. However, as will be presently described the pneumatic pressure is not applied directly to the diaphragm, and a damping action is introduced which serves to eliminate rapid movements of the diaphragm.

As the equipment is illustrated in the drawing (Fig. 1) it consists of a unit A which incorporates a bleed valve and associated fluid pressure operated members. This unit is connected by pipe 10 to the tank B. Preferably the open end of the pipe extends to or near the central axis of the tank in the lower portion of the same, as indicated at 11. Piping 12 also connects unit A with the control unit C, which can be conveniently mounted on a panel 13. This panel carries the pressure gauge 14, the readings of which show the level of liquid within the tank. Device C also connects with the air supply pipe 16, leading to a suitable source of air under pressure.

Unit A as illustrated in Fig. 2 consists of a suitable hollow body 17, which is annular in transverse cross-section, and which forms a mounting for the flexible diaphragm 18. The peripheral edge portion of the diaphragm 18 is shown clamped between the annular ring 19, and the circularly contoured closure plate 21. Ring 19 is carried upon the flange 22, formed on the body 17. Closure plate 21 together with diaphragm 18 forms a closed external chamber 23 which connects with the pipe 10.

The other side of the flexible diaphragm 18, that is the lower side as seen in Fig. 2, operatively connects with a pressure cell 24, and this cell in turn is associated with a second pressure cell 26. Both of these cells can be metal bellows of the "Sylphon" type, as illustrated. To form an operative connection between cell 24 and the diaphragm 18, the upper end of this cell is shown attached to the end wall 27, and this wall has a circular rim or flange 28, which surrounds the annular rib 29 formed upon the lower side of the diaphragm thrust plate 31.

The lower end of the cell 24 is secured and sealed with respect to a transverse wall 32. The peripheral edge portion of this wall is clamped to the body between the lower end of sleeve 33, and the annular shoulder 34. The upper end of sleeve 33 engages the lower side of ring 19.

The upper end of the cell 26 is likewise secured to and sealed with respect to wall 32, and the lower end of this cell is secured to and sealed with respect to the end wall 36. The interiors of the cells 24 and 26 are completely filled with a suitable liquid, such as glycerine or a mineral oil, and they are interconnected by the relatively small flow restricting orifice 37.

The bleed or pilot valve means consists of the stationary and movable valve members 38 and 39. Valve member 38 is shown as a circular or annular knife edge 41, surrounding the outflow or vent passage 42, and formed upon the inner end of the removable screw 43. Valve member 39 can be a simple insert formed of suitable composition or synthetic rubber and retained upon the lower side of the end wall 36. In full closed position of the movable valve member 39, the end wall 36 is adapted to engage an annular abutment 44 extending upwardly from the lower end of the body, and which is shown provided with ports 46.

The space or chamber 48 surrounding the cell 26 is connected to the pipe 12, whereby the exterior of the cell 26 is exposed to the pressure of air existing in the piping 12. The space 49 surrounding the cell 24 is connected to the atmosphere through the port 51.

With the cells 24 and 26 filled with liquid as described above, it is evident that flexing of diaphragm 18 in one direction, such as downwardly as viewed in Fig. 2, to compress the cell 24, causes displacement of liquid from this cell through a restricted orifice 37 to expand the cell 26. Likewise air pressure in chamber 48 tends to compress the cell 26, and any such compression expels liquid from this cell through orifice 37 to expand the cell 24. The effective area of the cell 26 which is exposed to air pressure in chamber 48 is preferably substantially less than the effective pressure area of the diaphragm 18. The effective fluid area of the diaphragm is preferably determined by a pair of rings or washers 53 and 54, which engage the sides of the diaphragm, and which definitely limit the area of the diaphragm subject to flexing. By changing the dimensions of the rings 53 and 54, the ratio between the effective area of the diaphragm, and the effective area of cell 26, can be adjusted to a desired value, to suit particular installation conditions.

The device C shown in Fig. 3 can consist of a body 56 having passages 57 and 58, which connect with the pipes 12 and 16. Passage 57 also connects with the pipe 59, leading to the pressure gauge 14. Communication between passages 57 and 58 is controlled by a small manually operated push valve. This valve can consist for example of a stationary valve seat 61, formed within the body, and cooperating with the movable valve member 62, which in turn is carried by the operating rod 63. A compression spring 64 urges valve member 62 upon the seat and the rod 63 is provided with a button 65.

A flow restricting orifice 66 is formed in the body 56 and serves to restrict flow of air from the source of pressure. This orifice may be varied as to size to suit varying installation conditions. The source of air to which pipe 16 connects should be maintained at a relatively constant pressure, and at a pressure level well above the pressure in pipe 12 for maximum reading of the gauge 14.

The apparatus described above operates as follows: Assuming a quantity of liquid in tank B, the pressure of this liquid is transmitted through pipe 10 to the diaphragm 18. Because the diaphragm is flexible it in turn transmits force to the cell 24 in a direction to compress the same. Liquid in cell 24 is therefore placed under pressure and this pressure is transmitted through orifice 37, to the liquid in cell 26. Assuming a static liquid level and that button 65 is depressed, the liquid pressure within cell 26 is exactly balanced by the pneumatic pressure in chamber 48. At the same time there is continuous bleeding off of air from chamber 48, through the valve passage 42. The bleed off is such as to maintain the pressure in chamber 48 constant. The pneumatic pressure in chamber 48 is indicated by the reading of gauge 14, and this reading is therefore an indication or measurement of the depth of liquid in tank B.

Assuming that there is an increase in the depth of liquid in tank B, the pressure upon diaphragm 18 is increased whereby a slight collapsing of cell 24 causes flow of liquid through orifice 37, to slightly expand cell 26. This in turn either closes or partially closes valve member 39 upon seat 41, thus permitting a building up of pressure in cell 48. The build up continues until equilibrium is again established, at which time the gauge 14 again indicates the liquid level. Actually unless the liquid level in tank B is increased very rapidly, the build up of pressure in chamber 48 takes place simultaneously and at about the same rate as the increase in the liquid level, so that there is no lag in the reestablishment of equilibrium.

A drop in liquid level in tank B causes a drop in pressure upon diaphragm 18, and this in turn conversely causes a slight expansion of cell 24 with flow through orifice 37 in a reverse direction, to slightly contract the cell 26. This in turn causes movement of the valve member 39 away from its seat to vent the air from chamber 48 at an increased rate until equilibrium is again established.

Instead of having pipes 16 and 12 continuously connected, as when the manual button 65 is continuously depressed, it is desirable to have this valve normally closed, and to simply depress the same manually to secure a reading of the gauge 14. The operation in such event is the same as previously described, except that equilibrium to secure proper reading of gauge 14 is quickly established, in each instance, when the button 65 is depressed.

Assuming that the diaphragm 18 has an effective fluid area considerably greater than that of the cell 26, it is apparent that the pressures in chamber 48 to establish equilibrium are substantially greater than the pressure which would be required if applied directly to the underside of diaphragm 18. Therefore for the average type of liquid tank it is not necessary to use special low pressure gauges, but standard gauges adapted for greater pressures can be employed with a high degree of accuracy. Such gauges can be calibrated to directly read in terms of depth of liquid, and the calibrations can be linear.

The damping action afforded by the cells 24 and 26, in conjunction with the orifice 37, serves to produce relatively accurate readings for the gauge 14, without fluttering of the gauge pointer, irrespective of surges which may take place in the tank B. Thus the device is particularly well adapted for installations where the tank is subject to movement, as on ships.

Because the diphragm 18 is located outside the tank and communicates near the axis of the tank through pipe 10, surges of liquid or tilting tend to have less effect in producing effective pressure variations on the diaphragm.

I claim:

1. In a liquid level gauge, a bleed valve comprising stationary and movable valve members, a source of gas under pressure connected to the bleed valve through a restricted orifice, a pressure gauge also connected to the outflow side of the orifice, a diaphragm forming a fixed fluid pressure area, means for applying liquid pressure from the lower portion of the tank to one side of the diaphragm, a compressible cell operatively connected to the diaphragm and adapted to be compressed or expanded reponsive to flexing movements of the diaphragm, a second compressible cell affording a fixed fluid pressure area and connected to the movable member of the bleed valve, both said cells being filled with liquid and being connected together through a flow restricting orifice, and means for applying pneumatic pressure from the outflow side of the first mentioned orifice to the fluid pressure area of the last named cell.

2. In a liquid level gauge, a bleed valve comprising stationary and movable valve members, a source of gas under pressure connected to the bleed valve through a restricted orifice, a pressure gauge also connected to the outflow side of the orifice, a diaphragm forming a fixed fluid pressure area, means for applying liquid pressure from the lower portion of the tank to one side of said diaphragm, a Sylphon tube operatively connected to the diaphragm and adapted to be compressed or expanded responsive to flexing movements of the diaphragm, a second Sylphon tube connected to the movable valve member of the bleed valve, both said Sylphon tubes being filled with liquid and the two tubes being connected by a flow restricting orifice, the second Sylphon tube affording a fluid pressure area differing from the fluid pressure area presented by the diaphragm, and means for applying fluid pressure from the outlet side of the first named restricted orifice to the pressure area presented by the second Sylphon tube.

3. In a liquid level responsive apparatus for tanks and of the type utilizing a bleed valve, a source of gas under pressure connected to the bleed valve through a restricted orifice and a pressure responsive device also connected to the outflow side of the orifice; a pressure responsive control unit comprising a diaphragm forming a fixed fluid pressure area, means forming a fluid chamber on one side of the diaphragm adapted to be connected to the lower portion of the tank, a compression cell operably connected to the diaphragm and adapted to be compressed or expanded responsive to flexing movements of the diaphragm, a second compressible cell affording a fixed fluid pressure area, a bleed valve comprising stationary and movable valve members, a connection between the second cell and the movable bleed valve member, both said cells being filled with liquid and being connected together through a flow restricting orifice, and means forming a fluid pressure chamber about said last named cell adapted for fluid connection to a source of pneumatic pressure.

4. In a liquid level gauge for tanks and of the type using a bleed valve, a source of gas under pressure connected to the bleed valve through a restricted orifice, and a pressure gauge also connected to the outflow side of the orifice and adapted to indicate the level of liquid in the tank; a pressure responsive control unit comprising a diaphragm forming a fixed fluid pressure area, means forming a liquid chamber on one side of the diaphragm and adapted for connection to the lower portion of the tank, a Sylphon tube operatively connected to the diaphragm and adapted to be compressed or expanded responsive to flexing movements of the diaphragm, a second Sylphon tube, a bleed valve comprising stationary and movable valve members, a connection between the movable bleed valve member and the second Sylphon tube, both said Sylphon tubes being filled with liquid and the two tubes being connected by a flow restricting orifice, the second Sylphon tube affording a fluid pressure area differing from the fluid pressure area presented by the diaphragm, and means forming a fluid chamber about said last named Sylphon tube adapted to be connected to the aforesaid outflow side of said first named orifice.

DOUGLAS H. ANNIN.

REFERENCES CITED

The following references are of record in the file of this patent:

UNITED STATES PATENTS

| Number    | Name           | Date          |
|-----------|----------------|---------------|
| 2,312,201 | Thompson et al.| Feb. 23, 1943 |
| 2,265,114 | Hartley        | Dec. 2, 1941  |
| 1,631,909 | Badin          | June 7, 1927  |
| 1,805,802 | Browne         | May 19, 1931  |
| 2,140,954 | Frazee         | Dec. 20, 1938 |

FOREIGN PATENTS

| Number  | Country | Date          |
|---------|---------|---------------|
| 375,979 | Italian | Oct. 26, 1939 |